Patented July 14, 1931

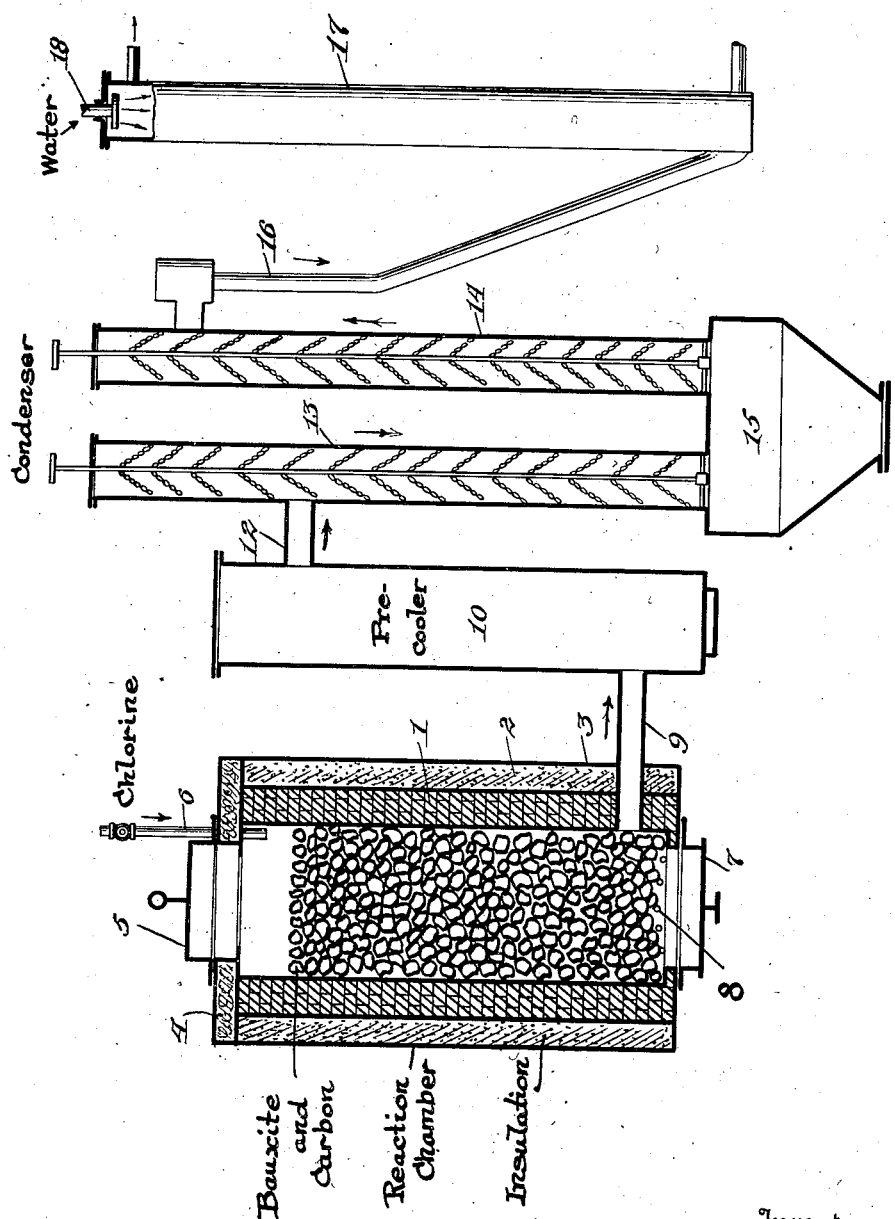

1,814,397

UNITED STATES PATENT OFFICE

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS

PROCESS OF MAKING ALUMINUM CHLORIDE

Application filed June 1, 1927. Serial No. 195,773.

This invention relates to processes of making aluminum chloride; and it comprises a method of making aluminum chloride from carbon and raw bauxite wherein calcined bauxite and carbon are mixed, the mixture carbonized and introduced while hot into a previously heated columnar chamber at a temperature sufficient to induce and continue the aluminum chloride forming reaction, the introduced material forming a pervious column, usually vertical, of substantial length and a current of chlorin is fed through the column at the maximum speed consistent with substantially complete absorption, passage of chlorin in this manner being continued until substantial quantities of chlorin appear in the effluent gases and vapors, at which time the flow of chlorin is interrupted, the length of the column restored by adding further quantities of carbon and bauxite, and the flow of chlorin resumed; all as more fully hereinafter set forth and as claimed.

The formation of vapors of aluminum chloride by treating a hot mixture of alumina and carbon with chlorin is a very old reaction; one which has been utilized for many years, although the exact chemistry of the reactions involved is not, even yet, definitely settled. Although the reaction requires a relatively high temperature (say 1000°–1200° F.) to inaugurate and continue it, no great quantity of heat is needed; that is, after the materials are at reacting temperature, no great amount of heat is absorbed. Really, the reaction, I find, with bauxite and carbon and chlorin is exothermic as a whole; that is, some heat is liberated in spite of the fact that two solid bodies, namely, carbon and alumina, are converted into gas and vapor. The amount of heat evolved depends upon the relative proportions of carbon and alumina and is greatest when the carbon is limited so as to allow $CO_2$ to appear in the efflux gases. On the other hand, to insure complete reaction, an ample supply of carbon is advisable. Under all circumstances, however, the fact is as stated: with the materials at reaction temperature and with loss of heat by radiation restricted, the reaction in general will keep itself going. In the prior art, however, it has been considered necessary to supply a continuous feed of heat to the retort or vessel in which the reaction is conducted. As it is a matter of some difficulty to find materials readily conducting heat and nevertheless resistant, at the temperatures here involved, to the action of chlorin, of carbon and of aluminum chloride, this supposed necessity has embarrassed the production of chloride. I have found that by the use of various expedients I am enabled to utilize the exothermic nature of the reaction to make it self-supporting, that is to obviate the use of heat from an external source. This renders the whole operation and the apparatus used simpler and more practicable. One of these expedients is a rapid rate of reaction; supplying a rapid flow of chlorin to the apparatus; and, so to speak, driving the action. The radiation loss in a time unit per square foot of exposed surface at a given temperature is constant, irrespective of the amount of reaction going on within the apparatus. If the rate of this reaction is sufficiently rapid, as compared with the area of heat radiating surface, the development of heat incident to the reaction forming aluminum chloride suffices to compensate for losses and the sensible heat carried away in effluent gases and vapors, and the reaction then goes ahead without any necessity for the supply of heat from external sources. A heightened ratio of heat development to radiating area can be secured by increasing the diameter of the apparatus, as well as by increasing the rapidity of the flow of chlorin and by sufficiently protecting all exposed surfaces against the loss of heat. In practice, I use all three expedients.

Furthermore, I customarily employ calcined bauxite in lieu of pure alumina. With bauxite calcined around 1800° F., the reaction, because of various impurities present (iron, silica, $TiO_2$ etc.), is somewhat more exothermic than with pure alumina. Calcination is necessary to remove moisture, which is extremely detrimental in this reaction.

I consider my invention as covering a process of producing aluminum chloride vapors from bauxite, carbon and chlorin which is thermally self-supporting; in which the reaction mass keeps alive and the reaction goes forward without a supply of external heat to the reaction chamber.

In a practical embodiment of the present invention, I calcine raw bauxite, which may be run-of-mine material, in any suitable way and finely grind it, mixing it with finely ground coking coal. Fine grinding may precede calcination. From this mixture I make briquets, ordinarily employing a small amount of wax tailings or other suitable binder. The briquets are shaped, pressed and baked in an ordinary way; the baking or carbonization being at a rather high temperature to get rid of, so far as possible, of all hydrocarbons and volatile matters. A temperature of 1200°–1500° F. will serve. If the carbonized material is supplied directly to the reaction chamber, its sensible heat is utilized.

While I find it advantageous to mix, briquet and carbonize as described, calcination of the bauxite and carbonization of the coal to give coke may be separately performed and the two hot materials introduced into the reaction chamber without any very intimate mixing. It is, in fact, found better to have some proportion of coarse or lump bauxite to maintain permeability of the charge, if the rest of the charge is fine. One of the reasons for using briquets is to secure permeability of the column.

For the manufacture of aluminum chloride, I customarily employ a vertical shaft chamber of brickwork or the like as a reaction chamber, this shaft being heat insulated as far as possible. I do not desire to make it less than about 3 feet in diameter; and greater diameters are better. Assuming that such an apparatus is to be put in operation, I first heat it up in an ordinary way. For example, a fire of wood, followed by coke, may be built in the shaft, the top and bottom being open for draft. A flame of oil or gas may be used for heating. After the shaft walls are sufficiently heated, the interior temperature being at least 1000° F., I introduce a charge of material into the shaft on top of such coke as may then remain from the preliminary heating up operation. This coke, at this time, is emitting carbon monoxid and carbon dioxid, which permeate the body of introduced material and assist in initiating reaction. Through the column of hot material, I pass chlorin as rapidly as is compatible with a substantially complete utilization; i. e., so that the tail gases going beyond the condenser do not show, say, more than 1 per cent of free chlorin. Introduction of chlorin is continued at this rapid rate until chlorin in proportions above the limit set begins to appear in the tail gases. I ordinarily pass the chlorin downward through the column. At the time when chlorin beyond the limit begins to appear, the column has wasted away and is now relatively short. The shaft is now refilled with a hot charge and the introduction of chlorin at the top, with removal of aluminum chloride vapors at the base, continued. Any ordinary type of condenser may be used. As, however, the vapors produced in treating crude bauxite usually contain silicon chloride and titanium chloride which go through the condenser unchanged, I usually lead the effluent gases and vapors from the aluminum chloride condenser finally through some type of scrubber to get rid of these bodies.

In the accompanying illustration, I have shown, more or less diagrammatically, certain apparatus capable of use in performing the present invention. In this showing, The figure is a view in central vertical section of a complete apparatus, certain parts being shown in elevation.

As shown, 1 is a tower of ordinary masonry. Fire brick serve well. This is surrounded by layer 2 of suitable heat insulating material, such as kieselguhr, powdered bauxite, etc., and an external jacket 3 of iron or steel. At the top, it is closed by cover 4 which can be readily removed for inspection or repairs. Element 5 is a retort head allowing introduction of solid materials and element 6 is a valved pipe for introduction of chlorin from a suitable source (not shown). At the bottom, the tower is provided with door 7 of any ordinary construction. Above this may be grate 8. Near the bottom is outlet line 9 for aluminum chloride vapors. As shown, the chloride conduit enters a vertical precooling chamber 10 which also serves as a dust trap. From this chamber the vapors go to conduit 12 to an aluminum chloride condenser consisting, as shown, of a pair of metal towers 13 and 14 provided with internal stirring mechanism and both opening at their bases into collection chamber 15. Aluminum chloride vapors pass downward through the first chamber 13 and upward through the second chamber 14. Effluent gases and vapors pass through conduit 16 into the base of a diagrammatically shown scrubber 17 having water introducing means 18 near its top.

In the use of this apparatus, tower 1 having been heated in a manner previously described, to a temperature of 1000° F. or thereabouts, is filled with a charge of reaction material produced as previously described, up to a point just below the top and downward introduction of chlorin begun. Aluminum chloride vapors are formed and pass forward through the condensing apparatus. The waste gases passing to the scrubbing tower are tested from time to time. Flow of chlorin is continued until a trace of chlorin shows up in the waste gases. The flow of chlorin is then interrupted. The tower is again filled with fresh, hot aluminous material and operation resumed.

What I claim is:—

The process of making vapors of aluminum chloride from a mixture of hot alumina and hot carbon with the aid of chlorin in thermally self-supporting manner, which comprises establishing a pervious vertical charge of such a hot mixture of substantial height and a diameter of three feet or more in a thermally insulated chamber, said materials being supplied at a temperature of at least 1000° F., feeding a current of chlorin to and through the charge at as rapid a rate as is consistent with substantially complete utilization of such chlorin, interrupting the feed of chlorin when free chlorin in amount over about one per cent appears in the effluent vapors, restoring the initial height of the column by charging fresh hot bauxite and carbon thereto and resuming the rapid feed of chlorin.

In testimony whereof, I have hereunto affixed my signature.

ALMER McDUFFIE McAFEE.